(12) United States Patent
Libin (10) Patent No.: US 11,539,918 B1
(45) Date of Patent: Dec. 27, 2022

(54) INTERACTIVE OBJECTS, ANCHORS, AND IMAGE SEARCH FOR IMMERSIVE VIDEO CONFERENCE SPACES WITH SHARED VIRTUAL CHANNELS

(71) Applicant: mmhmm inc., Little Rock, AR (US)

(72) Inventor: Phil Libin, San Francisco, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/402,787

(22) Filed: Aug. 16, 2021

Related U.S. Application Data (60) Provisional application No. 63/077,872, filed on Sep. 14, 2020.

(51) Int. Cl.
| | |
|---|---|
| *H04N 7/15* | (2006.01) |
| *G06F 3/04845* | (2022.01) |
| *H04L 65/403* | (2022.01) |
| *H04L 12/18* | (2006.01) |
| *G06F 3/0487* | (2013.01) |

(52) U.S. Cl.
CPC .............. *H04N 7/15* (2013.01); *G06F 3/0487* (2013.01); *G06F 3/04845* (2013.01); *H04L 12/1822* (2013.01); *H04L 65/403* (2013.01)

(58) Field of Classification Search
CPC ....... H04N 7/15; G06F 3/0484; G06F 3/0587; H04L 12/18
USPC .......................................... 348/14.01–14.16
See application file for complete search history.

(56) References Cited

U.S. PATENT DOCUMENTS

| | | | | |
|---|---|---|---|---|
| 2005/0004982 | A1* | 1/2005 | Vernon | H04N 7/15 709/204 |
| 2011/0242277 | A1* | 10/2011 | Do | H04N 5/272 348/E13.064 |
| 2013/0239063 | A1* | 9/2013 | Ubillos | G06F 16/54 715/838 |
| 2014/0006974 | A1* | 1/2014 | Bell | H04L 65/403 715/753 |
| 2022/0070389 | A1* | 3/2022 | Tangeland | G06T 5/007 |

FOREIGN PATENT DOCUMENTS

WO    WO-2020153111 A1 *  7/2020 .......... G06F 40/103

* cited by examiner

Primary Examiner — Melur Ramakrishnaiah
(74) Attorney, Agent, or Firm — Muirhead and Saturnelli, LLC (57) ABSTRACT

Manipulating an image in an immersive video conference space includes associating an anchor to a background of the immersive video conference space, static interior objects in the immersive video conference space, and/or dynamic interior objects in the immersive video conference space or an area within a display pane of the immersive video conference space and actuating an anchor activation control that causes the image to move to a position of the anchor. The image may be an image of the presenter. The presenter may provide a gesture that actuates the anchor activation. The gesture may be a keyboard shortcut or a touch gesture. The touch gesture may be a tap, a swipe, or a tap and hold. The image may move to the position of the anchor along a transitional route. The image may change appearance as the image moves to the position of the anchor along the transitional route.

18 Claims, 8 Drawing Sheets

INTERACTIVE OBJECTS, ANCHORS, AND IMAGE SEARCH FOR IMMERSIVE VIDEO CONFERENCE SPACES WITH SHARED VIRTUAL CHANNELS

CROSS-REFERENCE TO RELATED APPLICATIONS

This application claims priority to U.S. Prov. App. No. 63/077,872, filed on Sep. 14, 2020, and entitled "INTERACTIVE OBJECTS, ANCHORS AND IMAGE SEARCH FOR IMMERSIVE CONFERENCE SPACES WITH SHARED VIRTUAL CHANNELS", which is incorporated herein by reference.

TECHNICAL FIELD

This application is directed to the field of information processing and video conferencing, and more specifically to the field of setting up and manipulating immersive video conference spaces with interactive objects and anchors and performing image searches for immersive video conference spaces.

BACKGROUND OF THE INVENTION

The role of video conferencing has been steadily growing in recent years, following important workforce and communication trends and quick emergence of the international distributed workforce. The significance of remote video communications has exploded in 2020 in response to the COVID-19 pandemic, which required billions of people to stay at home for prolonged periods of time, severely limiting travel and in-person communications with irreversible consequences to work and personal lives.

Many experts already consider video conferencing the most important productivity medium, connecting people through their work, education, personal and family lives. The size of global video conferencing market has reached $5.77 billion USD in 2020 and is expected to grow to $6.28 billion by the end of 2021 and to almost $13 billion by 2028. These projections may be dwarfed by the skyrocketing demand in efficient visual communications, boosted by fast growth of the distributed workforce, accelerated by the COVID-19 pandemic and by other factors stimulating fast increase of the remote work style, as well as by long-term changes in team collaboration and productivity paradigms.

Market statistics show that global remote workforce has increased by 140% since 2005; 55% of companies allow for remote work, which will increase by another 77% between 2019 and 2022. Thirty percent of employees are already full-time remote workers and 62% work from home occasionally. Productivity gains from the remote work and specifically from video conferencing has been captured by many polls; thus, 77% of remote workers report higher productivity and 43% of workers believe that video conferencing can enhance their productivity. Seventy-eight percent of corporate businesses use video conferencing to facilitate team collaboration. The top five providers of video conferencing services: Zoom, GoToWebinar, Cisco Webex, ON24 and Adobe Connect have almost 80% of the web conferencing market share; during the quarantine months of 2020, Google Hangout Meets and Microsoft Teams have also seen fast growing demand; thus, Google Hangout Meets had over 100 million daily participants and Microsoft Teams almost 75 million active daily users in 2020.

SUMMARY OF THE INVENTION

According to the system described herein, manipulating an image in an immersive video conference space includes associating an anchor to a background of the immersive video conference space, static interior objects in the immersive video conference space, and/or dynamic interior objects in the immersive video conference space or an area within a display pane of the immersive video conference space and actuating an anchor activation control that causes the image to move to a position of the anchor. The image may be an image of the presenter. The presenter may provide a gesture that actuates the anchor activation. The gesture may be a keyboard shortcut or a touch gesture. The touch gesture may be a tap, a swipe, or a tap and hold. The image may move to the position of the anchor along a transitional route. The image may change appearance as the image moves to the position of the anchor along the transitional route. The position of the anchors may be preset before a start of a video conference or a recorded presentation that uses the individual conference space. The position of the anchors may be created on the fly during a video conference that uses individual conference space.

According further to the system described herein, soliciting feedback from participants in a video conference includes displaying a form via a display pane of a shared virtual channel that is used to provide the video conference, requesting that participants of the video conference fill out the form to generate a plurality of completed forms, and adjusting contents of the video conference based on information provided on the completed forms. A presenter may request that at least a subset of the participants fill out the form. The presenter may adjust the contents of the video conference based on the completed forms. A presenter of the video conference may invite the particular one of the participants to become a co-presenter. The at least one of the completed forms may contain information provided by the particular one of the participants. A particular one of the participants may become a co-presenter for the video conference that provides comments to the form and/or at least one of the completed forms. The form may be a registration form that is presented to new participants when the new participants join the video conference. A presenter of the video conference may adjust the contents of the video conference based on completed forms of the new participants.

According further to the system described herein, providing illustrations for a presentation that uses an immersive video conference space includes detecting a named entity mentioned by a presenter in an immersive video conference or a recorded presentation that uses the immersive video conference space, searching a slide deck associated with the immersive video conference or a recorded presentation for an image corresponding to the named entity, and searching online for an image corresponding to the named entity in response to the slide deck not containing an image corresponding to the named entity. Images may be rated according to relevance scores of search candidates according to audience sentiment recognition based on audience reactions prior to searching online for the image, context analysis, and/or feedback of participants of the immersive video conference prior to searching online for the image. The presenter may choose one of a plurality of relevant candidate images for display to participants on the shared virtual channel. The relevant candidate images may be viewable only by the presenter prior to being chosen by the presenter. The presenter may choose one of a plurality of relevant candidate images using a touch, a 3D gesture, and/or an approval keyword and wherein the 3D gesture is one of: a hand gesture or a nod.

According further to the system described herein, a non-transitory computer readable medium contains software that, when executed, performs the steps set forth above.

An increasing number of participants of video conferences are joining from their homes. The conventional matrix layout of user interface where every participant occupies a separate cell is being gradually replaced by immersive multi-user interfaces pioneered by mmhmm inc. and other companies where participants may join from their individual conference spaces and subsequently be immersed into the individual or expanded virtual conference rooms shared with other participants, where each participant or group of participants may appear as a presenter, co-presenter, member of a discussion panel and in other roles. Additionally, collaborative viewing, manipulations and processing of documents and presentations may occur in shared virtual channels placed within the same conference rooms, replacing or supplementing the conventional screen sharing and allowing presenters, co-presenters, and other participants to perform meetings in a more realistic and productive environments.

The emergence of immersive video conferences with physically separated participants and embedded virtual channels and other dynamic objects presents significant challenges in many areas, including the control of user positioning and movements in the immersive spaces, real-time modification of presentation agendas following user feedback and other forms of interaction between presenter and participants, enrichment of presentation content with new materials, etc. Accordingly, it is important to develop mechanisms for advanced control of presenter and participant positioning in the immersive virtual space, interaction between presenter and participants, and enhancements of immersive video conference content presented in shared virtual channels.

The proposed system enhances immersive video conferences and recorded immersive presentations based on individual conference spaces with shared virtual channels, as such presentations, conference spaces and channels as described in U.S. patent application Ser. No. 17/323,137 titled: "INDIVIDUAL VIDEO CONFERENCING SPACES WITH SHARED VIRTUAL CHANNELS AND IMMERSIVE USERS", filed on May 18, 2021 by Libin and incorporated by reference herein. The enhancements include preset or dynamically created anchors for precise positioning of presenters, participants and other dynamic objects; inline completion and processing of interactive forms, questionnaires and other content introduced via shared virtual channels and potentially affecting the course of a conference; and text-driven image search enriching conference content with ad hoc illustrations based on named object recognition and contextual analysis of a voice presentation and a visual content of a virtual channel.

Various aspects of system functioning are explained as follows.

1. Anchors for dynamic objects. Dynamic objects associated with a visual environment of a presentation may include anchors attached to the background of an individual conference space, to static or dynamic interior objects in the conference space or to the content of shared virtual channels.

Anchors may possess several attributes and features explained below:
   A source, typically a presenter or another dynamic object.
   A destination, such as a location within a conference space's background, an object within a conference space or an area within the display pane of a virtual channel;
   An appearance, including shape, size, transparency, color, and other features of the source when the source is aligned with the anchor destination;
   A transition route, such as an instant snap of the source to destination position of the anchor or a transitional path, possibly including morphing of visual characteristics of the source from a start appearance of the source to appearance of the source at the destination (if these appearances differ) or other dynamic indicator of the path, for example, displaying the trace without showing the source object; and
   An anchor activation control, which may be a keyboard shortcut, a touch gesture (tap, swipe, tap and hold) or other command, as well as some combinations of the above. The control may also include parameters that indicate choices between various options of anchor features.

Invoking an anchor via an activation control causes the source to reposition to a destination along the transition route and causes the appearance of the source to change, as applicable. Destinations may be defined by absolute or relative coordinates or other references within the individual conference space and/or shared virtual channels.

Anchors may be preset before the start of a video conference or a recorded presentation or may be created on the fly, during the presentation by the presenter or other authorized participants. Anchor positions may be highlighted on a screen of a presenter for easy operation. Anchors may also be deleted by the presenter or by other authorized participants.

Anchor examples may include:
   a. Snapping a presenter to a specific location on a background of a conference space, for example, putting the presenter at a table in a historical room or within a key scene in a movie;
   b. Moving a virtual instrument (e.g., a screwdriver) to a start position during an instructional presentation on a furniture assembly;
   c. Positioning a presenter near a predefined area on a slide displayed in a shared virtual channel before starting a voice explanation of content of the slide. Thus, if the presenter is explaining a worksheet, anchors may be placed on top of several columns of the worksheet, so an image of the presenter (properly resized) appears on top of a column simultaneously with the start of discussion of that data of the column.

2. Interactive forms and questionnaires. Interactive objects associated with channel content may include forms, quizzes, inline tests, polls, tasks, and other types of interactive content soliciting an instant feedback by the audience. Such objects may be displayed within shared virtual channels, may be instantly completed by the audience, instantly processed, and summarized and may affect the flow of a conference or a recorded presentation. Additionally, participants may be invited by a presenter and immersed into a conference or presentation space to comment on the forms, comment on responses for the forms, provide recommendations to other participants and/or a presenter, etc.
   Examples:
   a. An individual or a small group join a presentation. A virtual channel with a presentation title or an intro slide is displayed next to an image of the presenter. Once the presence of the new participant is detected, the presenter or an assistant puts a registration form into the channel; the form may be completed by voice input from new participant(s) and information of the participants may be captured and pre-processed, which may influence the presentation flow.
  b. A presenter shares with the audience a slide deck with the main portion, which subsequently branches into discussions on several different subjects. The audience may have joined by signing up for the presentation and may be unknown to the presenter; participants interest in different continuations of the core presentations may vary, but by offering a series of inline feedback forms, quizzes, combined with face and gesture recognition technologies and other participant feedback, the presenter(s) may recognize the preferred flow of the presentation and limit the presentation to a specific subject.
3. Image search for ad hoc illustrations to presentations. An ad hoc text-to-image search and identification may be provided during an immersive video conference with shared virtual channels as an additional source of illustrations to a presentation.

The system may use Named Entity Recognition to extract candidates for text-driven image search via speech-to-text conversion of a talk of a presenter, combined with the presentation content in a virtual channel. Relevance scores of search candidates may be assessed via sentiment recognition, context analysis, audience feedback and other factors assessed through the duration of an immersive video conference prior to the start of the image search aimed at obtaining additional or missing visual illustrations to the presentation.

Subsequently, an instant online image search may be conducted for most relevant candidates and may be displayed in a separate or main virtual channel as an illustration. An additional identification step may compare top search results with the existing presentation content in the virtual channel(s) to avoid potential duplications. A presenter may also use vocal or visual cues, such as an emphatic intonation, a keyword, or a special phrase structure (with named entities inside the phrase) to express the desirability of an additional illustration to the presentation, provided via image search. Additionally, top search results recommended for the illustration purpose may be placed into a hidden virtual preview pane or channel (visible to the presenter but not to other participants), waiting for approval of the presenter (with possible timeouts). The presenter may approve images using a touch or a 3D gesture (for example, a tap on an image or a nod), an approval keyword or other method. Presenters may recall images by reference if the images are absent from a presentation content.

Examples:
  a. A presentation on the WWII history names the Yalta Conference. The system checks the virtual channel and doesn't find illustrations in several adjacent slides. An image search finds an iconic photo of the three world leaders attending the Yalta conference, and displays the image in the virtual channel (possibly after approval of the presenter).
  b. [A combined example of interactive forms, anchors, and image search] An online visa related interview is conducted by a consulate where a consular officer is collecting and examining data of applicant(s). The officer briefly presents necessary steps and documents and displays an interactive application form, which the applicant completes via keyboard or voice input. With permission of the applicant, the system searches a computer of the applicant for a passport quality photo of the applicant satisfying visa photograph requirements. The form has an anchor for attaching the photograph, which automatically appears in the required area of the application if the photograph has been identified and approved.
  c. A medical professional conducts a lecture via an immersive video conference space with a shared virtual channel and talks about x-rays; the presentation reflects only the key bullet point text on the topic and the presenter wishes to illustrate the presentation. The presenter may say, for example: "Let's take a look at an illustration of a chest x-ray showing pneumonia", which would trigger an image search by reference and the system may display a single image or a slide with multiple images found online and illustrating various cases of chest x-ray images reflecting the pneumonia diagnosis.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for presetting or dynamically created anchors for precise positioning of presenters, participants, and other dynamic objects of an immersive video conference with individual conference spaces and shared virtual channels, for inline completion and processing of interactive forms, questionnaires and other content introduced via shared virtual channels and text-driven image search and enrichments of a conference content with ad hoc illustrations.

Figure 1:
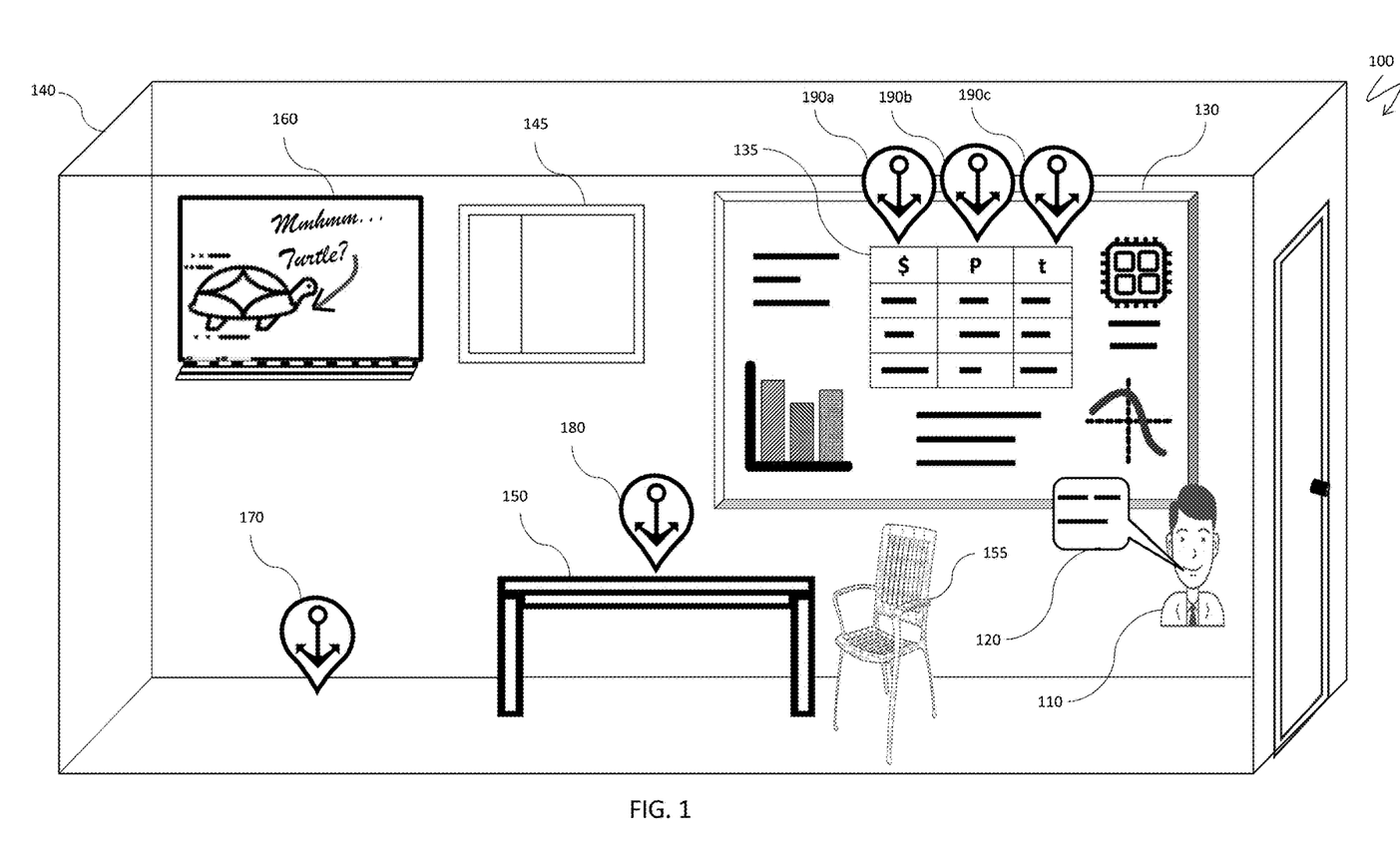
FIG. 1 is a schematic illustration of setting up anchors in a virtual presentation room and channel, according to an embodiment of the system described herein.

FIG. 1 is a schematic illustration 100 of setting up anchors in a virtual presentation room and channel. A presenter 110 gives a talk 120 based on a content of a shared virtual channel 130. The content includes, among other materials, a three-column table 135 and the virtual channel 130 is opened on a wall of an immersive video conference space 140. The immersive video conference space 140 may include a physical space where the presenter 110 resides, which may include virtual components, such as the shared virtual channel 130, or may be a fully emulated virtual space where presence of the presenter is immersive. The immersive video conference space 140 may have a window 145, two pieces of furniture 150, 155 and a physical whiteboard 160.

Prior to the start of a video conference and a presentation, the presenter 110 or other person, such as a conference organizer, sets up several anchors associated with different objects used during the presentation: an anchor 170 associated with the whiteboard 160, an anchor 180 associated with the desk 150, and three anchors 190a, 190b, 190c associated with columns of the table 135. Each of the anchors 170, 180, 190a, 190b, 190c has a list of attributes, explained elsewhere herein (see the bullet point 1 in the Summary section).

Figure 2:
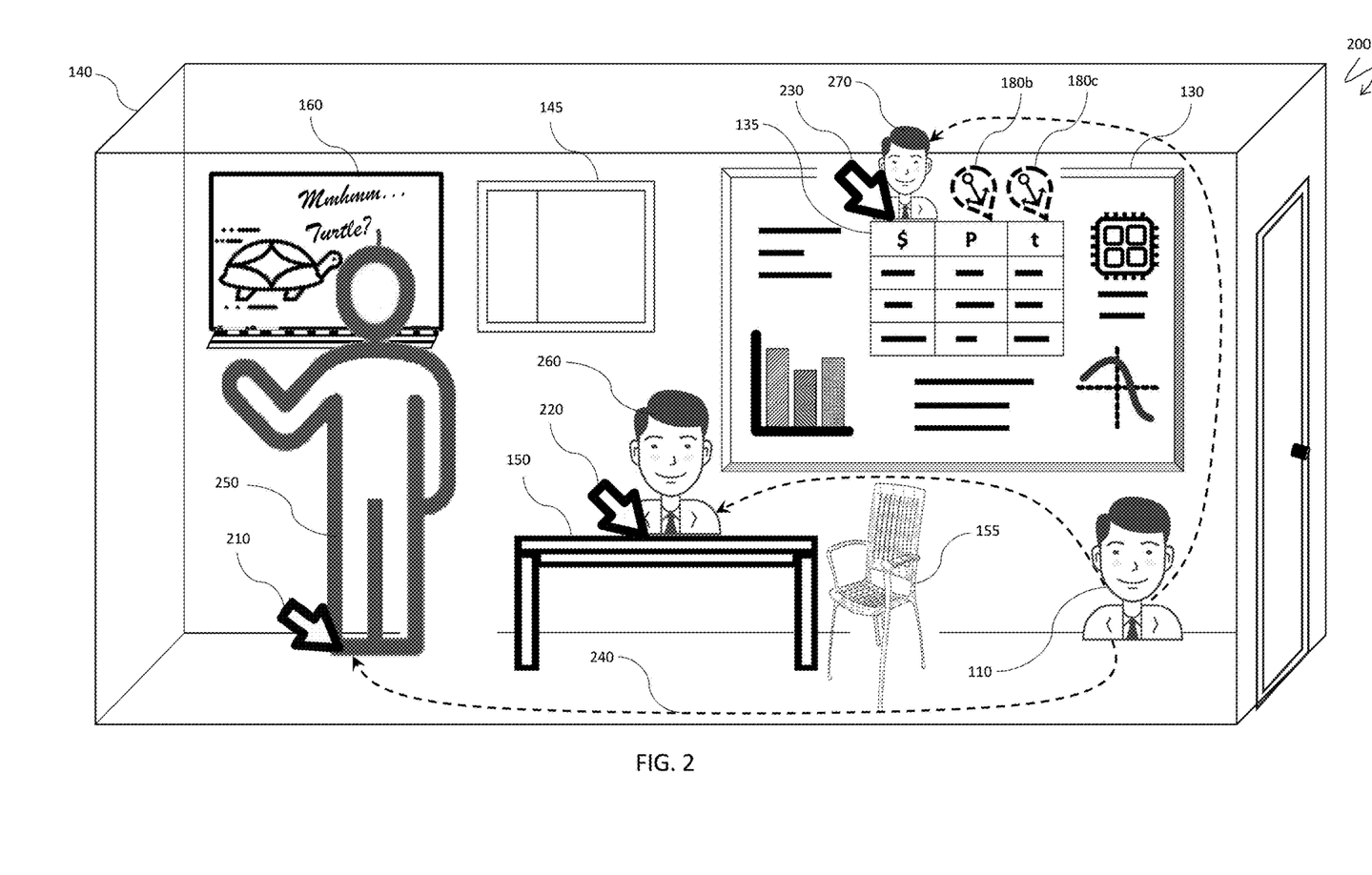
FIG. 2 is a schematic illustration of anchor activation, repositioning and transforming of a presenter image, according to an embodiment of the system described herein.

FIG. 2 is a schematic illustration 200 of anchor activation, repositioning and transforming of a presenter image. Analogously to FIG. 1, the presenter 110 discusses the content of the shared virtual channel 130 with the three-column table 135, residing in the immersive video conference space 140 with the window 145, the furniture 150, 155 and the whiteboard 160.

When the presenter 110, during a talk provided by the presenter 110, activates an anchor using a click, a touch gesture or other method, an image of the presenter 110 is instantly repositioned from a previous location, snapped at the anchor position, and assumes an appearance designed for the anchor, as explained elsewhere herein. FIG. 2 includes several examples of anchor activation and the accompanying changes:

When the presenter 110 activates the anchor 170 (not shown in FIG. 2) by making an activation gesture 210 (shown in FIG. 2 as a point-and-click gesture but may be a swipe, an encircling of the anchor or any other gesture or control, such as a voice command), the image of the presenter 110 moves from an original position near the shared virtual channel to a location of the anchor 170 at the whiteboard 160, as illustrated by a dashed arrow 240. Relocation may be instant or may be accompanied by various effects, including various types of animation, for example, morphing of an image of the presenter 110 from the original appearance to a standing posture 250 at the whiteboard 160. An example of application of such an anchor could be a pre-recorded portion of a presentation where the presenter 110 is drawing on the whiteboard 160; by activating the anchor, the presenter 110 relocates an image of the presenter 110 to the whiteboard 160 and starts the replay of the pre-recorded video clip.

When the presenter 110 activates the anchor 180 from FIG. 1 (not shown in FIG. 2) with a gesture 220, a new presenter position 260, without resizing, emulates the presenter 110 sitting at the desk 150 and continuing the presentation, which may be useful when a fragment of a talk of the presenter 110 is directed to the audience and is not related to the content of the shared virtual channel 130; in fact, the channel 130 may even be automatically minimized or temporarily closed in conjunction with the activation gesture 220, which switches the attention of the audience to a central position 260 of the presenter 110 in the immersive video conference space.

In contrast with the previous case, activating the anchor 190a (not shown in FIG. 2) with a gesture 230 attracts the attention of conference participants to details of the content presented in the virtual channel 130—specifically, to the left column of the table 135. The image of the presenter 110 is resized to align with the presented material. Once the presenter 110 completes explanations for the left column of the table 135, the next anchor 190b may be activated analogously; alternatively, pressing right and left arrow keys (possibly in combination with modifying keys) may navigate the image of the presenter 110 between the three columns of the table 135 to shift the focus of audience attention during explanations by the presenter 110.

Figure 3:
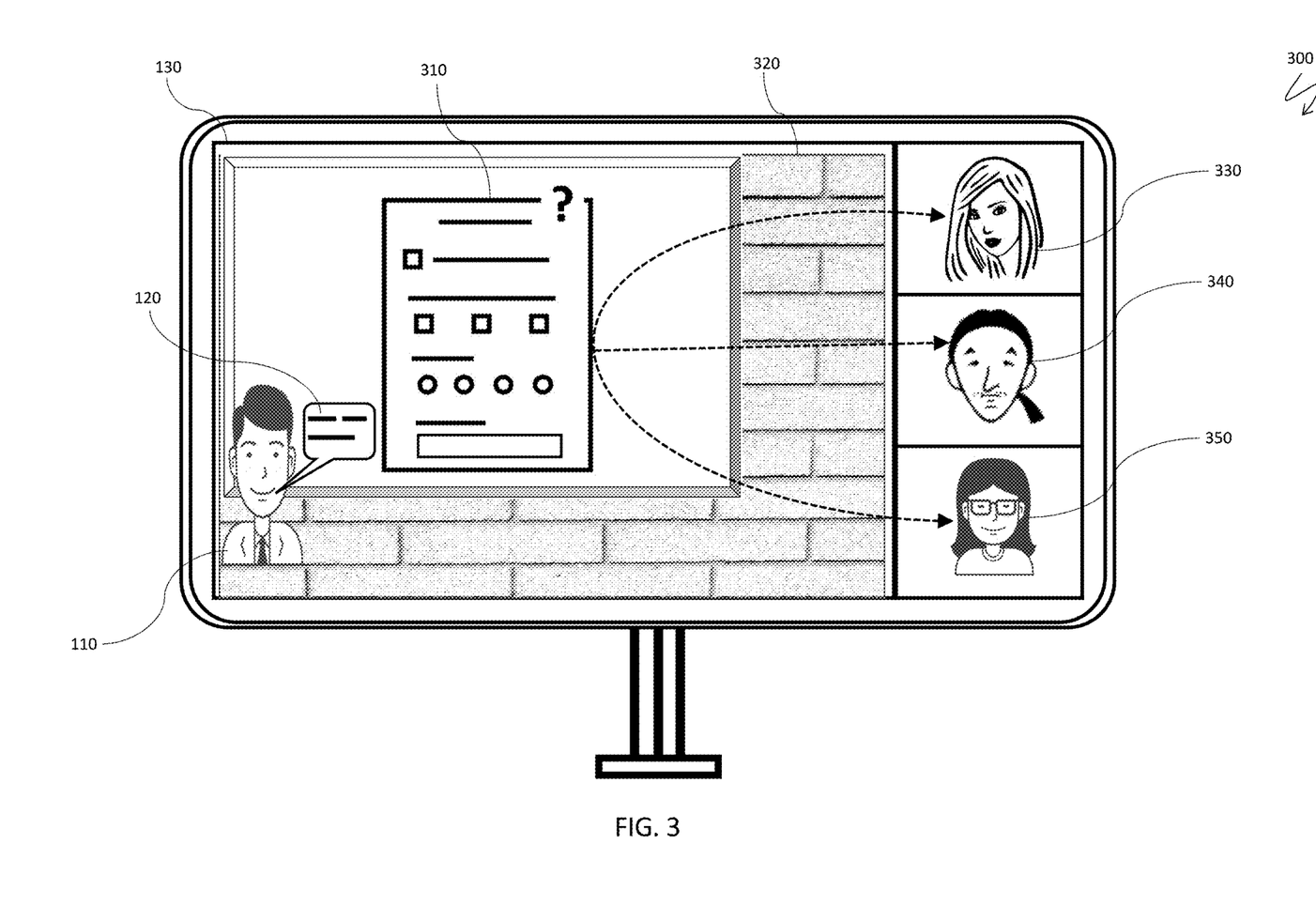
FIG. 3 is a schematic illustration of offering a form (questionnaire) in a virtual channel for completion by video conference participants, according to an embodiment of the system described herein.

FIG. 3 is a schematic illustration 300 of offering a form (questionnaire, quiz, poll) in the virtual channel 130 for completion by video conference participants 330, 340, 350. The presenter 110 is positioned on the side of the shared virtual channel 130 opened on top of a virtual background 320. The presenter 110 displays a form 310 (a questionnaire, poll, quiz, etc.) in the channel 130 and includes in the talk 120 a request directed to the conference participants 330, 340, 350 to complete the form 310.

Figure 4:
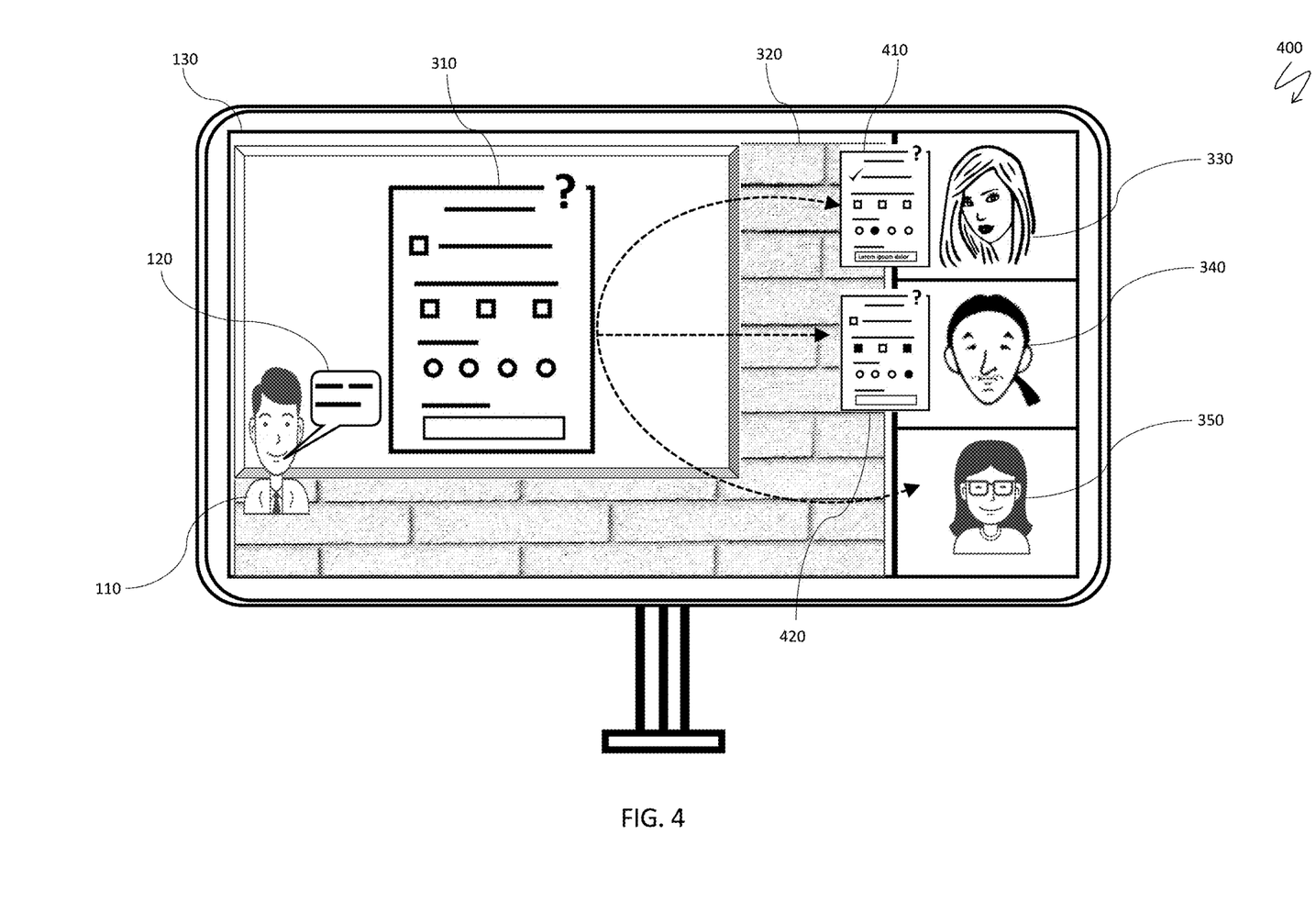
FIG. 4 is a schematic illustration of a selective completion of forms by video conference participants, according to an embodiment of the system described herein.

FIG. 4 is a schematic illustration 400 of a selective completion of forms by the video conference participants 330, 340, 350. Under the same notations as in FIG. 3, the presenter 110 is positioned on the side of the shared virtual channel 130 and is displayed on top of the virtual background 320. The presenter 110 places the form 310 in the channel 130 and invites the video conference participants 330, 340, 350, in the talk 120, to complete the form 310. Only a portion of the participants 330, 340, 350, namely, the participants 320, 330, fill in the form 310 and return completed copies 410, 420.

Figure 5:
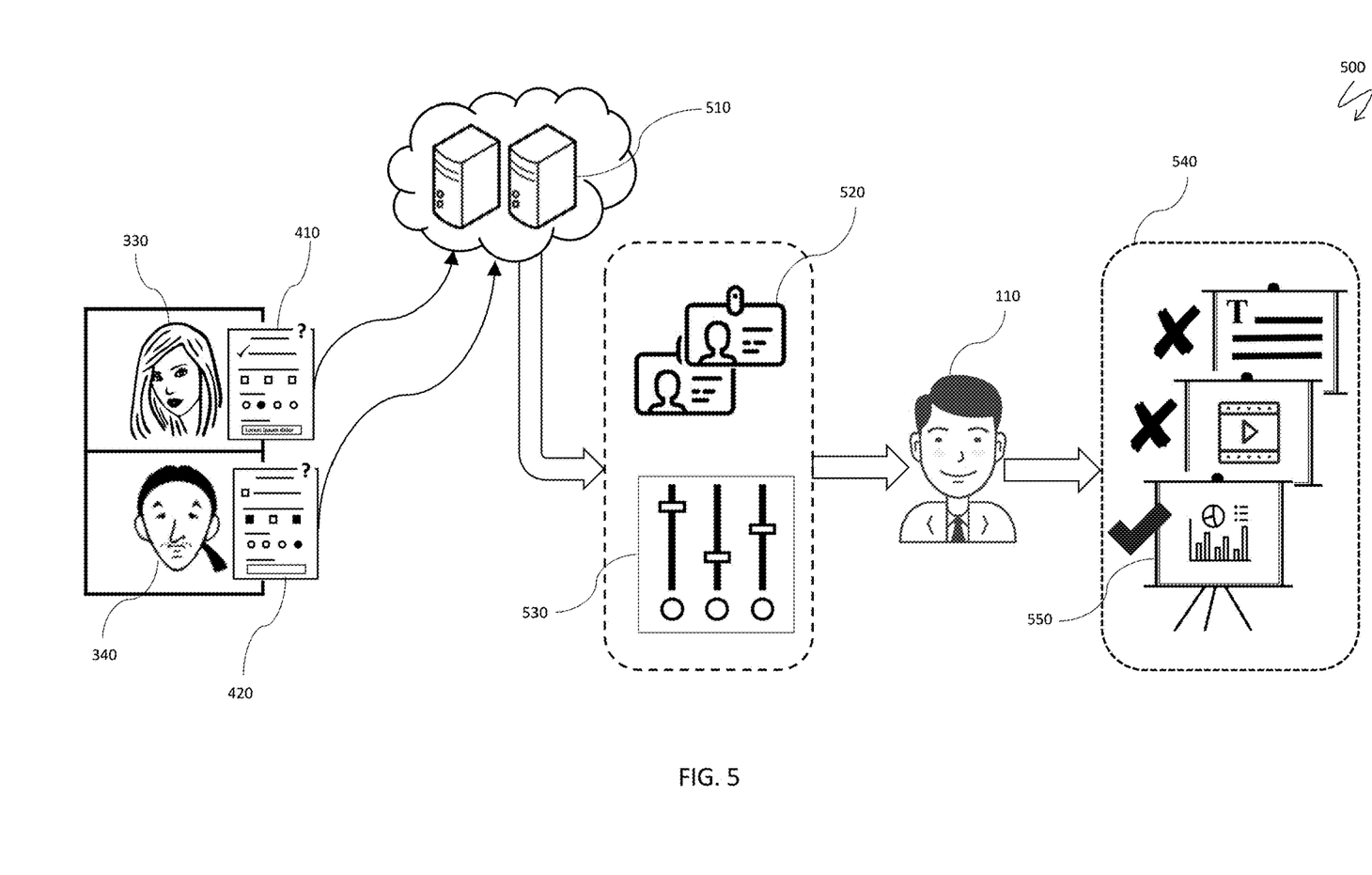
FIG. 5 is a schematic illustration of building and using profiles and preferences of video conference participants based on completed forms, according to an embodiment of the system described herein.

FIG. 5 is a schematic illustration 500 of building and using profiles and preferences of video conference participants based on the completed forms 410, 420. In the notations of FIGS. 3, 4, the video conference participants 330, 340 have filled in the form 310 posted by the presenter 110 in the shared virtual channel 130 and returned the completed copies 410, 420. A forms processing component 510 (shown in FIG. 5 in the cloud installation, although different versions of the component may also be used) processes the completed forms 410, 420 and builds or augments the profiles 520 and the preferences 530 of the participants 330, 340. A summary information related to processing of the completed forms 410, 420 may be delivered to the presenter 110 in a private view (not shown in FIG. 5). The presenter 110 may use information of the preferences of the participants 330, 340 obtained during the presentation for altering the course of the presentation or augmenting content of the presentation, as shown by a set 540 of alternative continuations of the presentation and a choice 550 of the presenter 110 based on the profiles 520 and the preferences 530.

This approach to the dynamic construction of presentations may be especially efficient in situations when the audience changes during the presentation, as may occur during webinars (see also Example b in the bullet point 2 of the Summary section) and may be detected by the forms processing component and by other system components.

Figure 6:
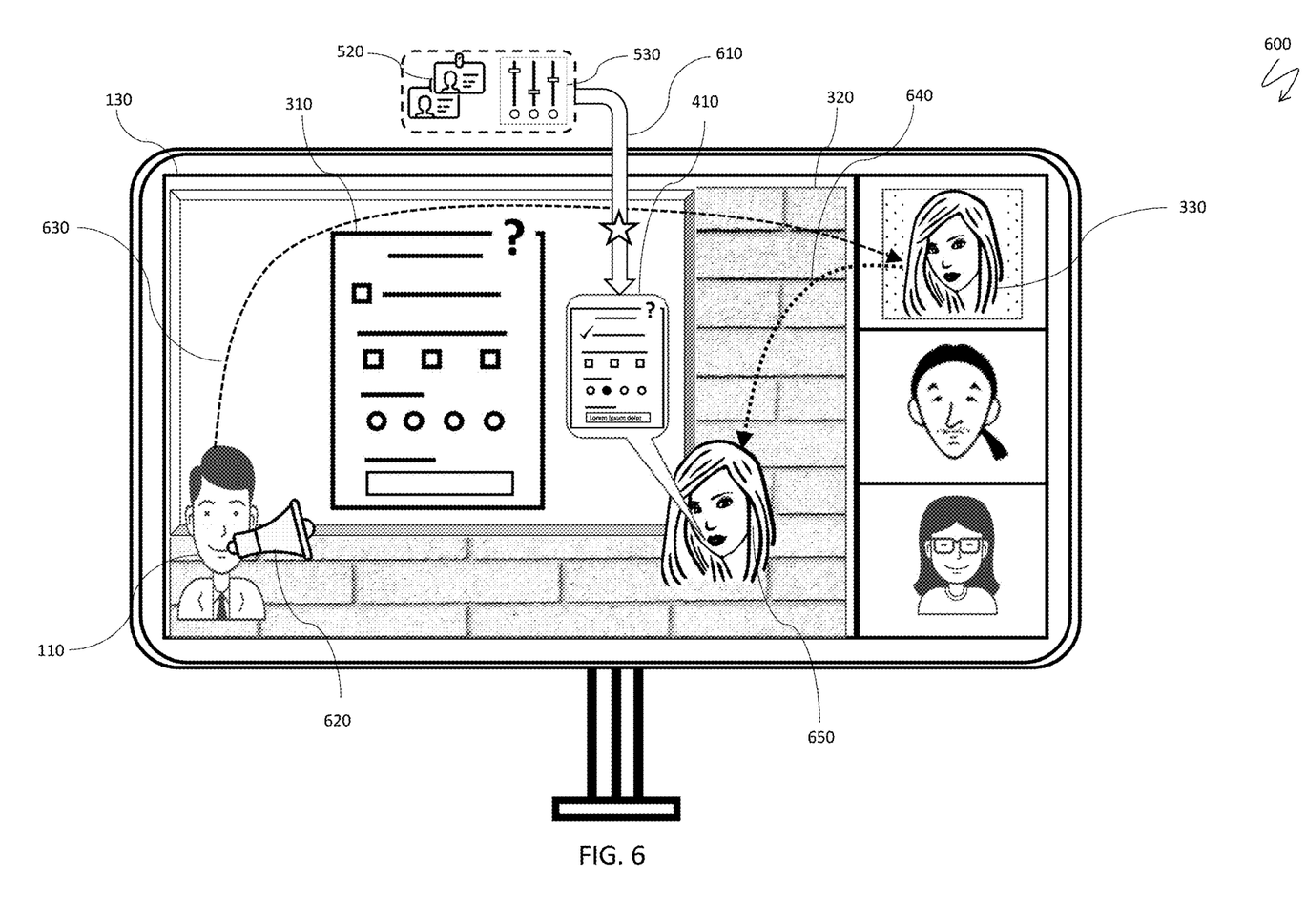
FIG. 6 is a schematic illustration of a participant of an immersive video conference joining a presenter to comment on a completed form, according to an embodiment of the system described herein.

FIG. 6 is a schematic illustration 600 of a participant of an immersive video conference joining a presenter to comment on a completed form. Under the same notations as in FIGS. 3, 4, the presenter 110 is positioned on the side of the shared virtual channel 130 and is displayed on top of the virtual background 130. The presenter 110 places the form 310 in the channel 130 and invites video conference participants to complete the form. The participant 330, whose image is initially displayed in a separate cell of the meeting grid (highlighted in FIG. 6 by the dot pattern) and may or may not be seen by other meeting participants, fills the form, as shown by the completed copy 410 (see FIGS. 4, 5 and the accompanying text for more information).

The forms processing component (not shown in FIG. 6) may determine that the completed form 410 may be of particular importance, as highlighted by an arrow 610; for example, the form 410 may correspond to a desired target profile among profiles 520 and preferences 530 of video conference participants. Additionally (or alternatively), the system may determine that some of the video conference participants may need clarifications about the form 410. In such case, the forms processing component may recommend that the presenter 110 obtain comments and explanations from the user 330. Accordingly, the presenter 110 may send the participant 330 an invitation 620, also illustrated by an arrow 630, to join the presentation (potentially, for a short period of time) in a role of co-presenter, as described in U.S. patent application Ser. No. 17/323,137 titled: "INDIVIDUAL VIDEO CONFERENCING SPACES WITH SHARED VIRTUAL CHANNELS AND IMMERSIVE USERS", filed on May 18, 2021 by Libin and incorporated by reference herein. The participant 330 may accept the invitation 620 by the presenter 110, as shown by an arrow 640, and join the presentation as an immersive co-presenter 650, commenting on the original form 310, the completed form 410, communicating with the presenter 110 and offering explanations and recommendations related to the forms. Multiple participants may be immersed into the presentation space and join the presenter 110 to share their thoughts, explanations, and recommendations on the form.

Figure 7:
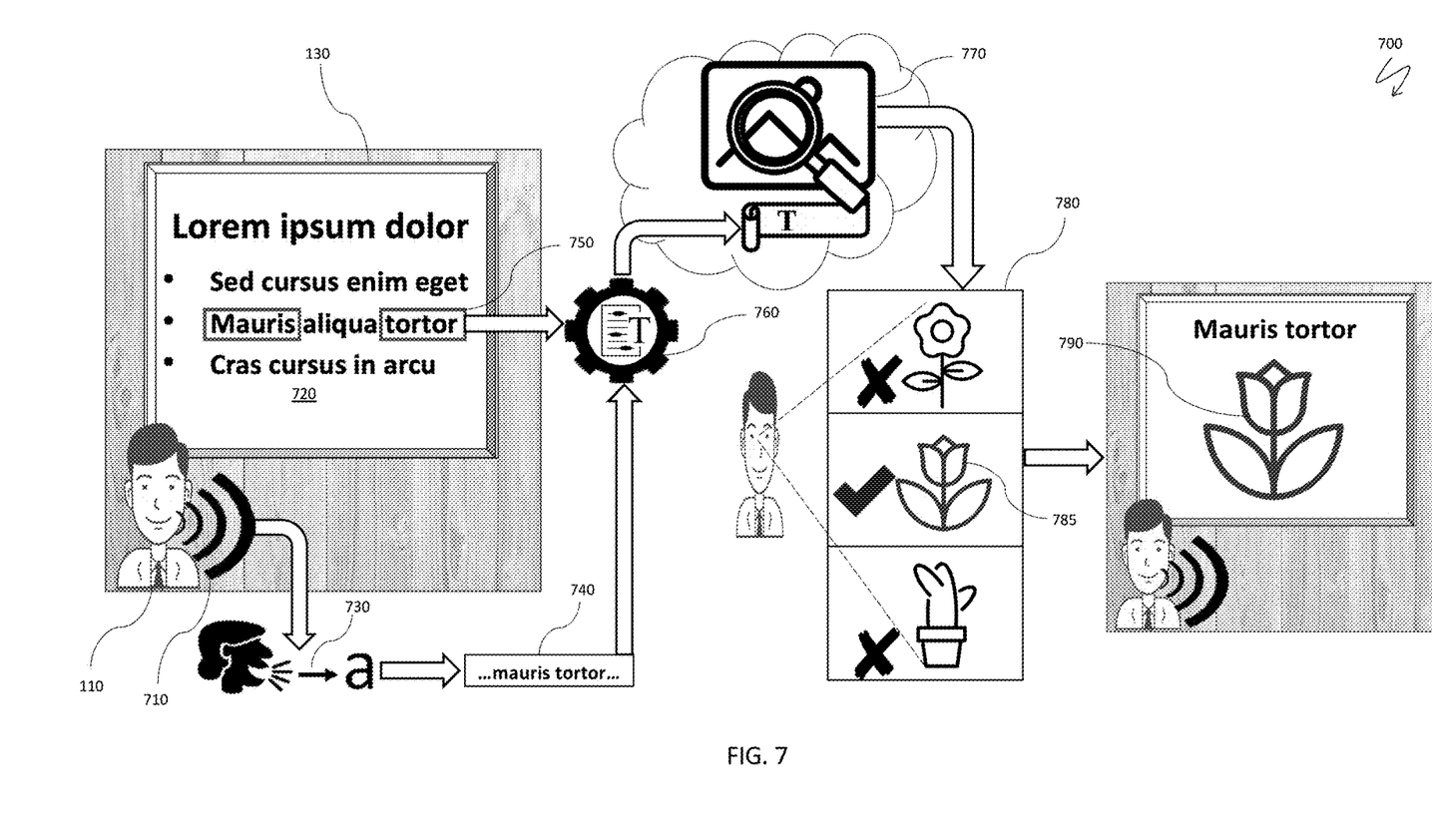
FIG. 7 is a schematic illustration of enriching presentations with illustrative materials via an ad hoc image search, according to an embodiment of the system described herein.

FIG. 7 is a schematic illustration 700 of enriching presentations with illustrative materials via an ad hoc image search, which corresponds to one of the search scenarios explained elsewhere herein (see, for example, the text following the bullet point 3 in the Summary section). The presenter 110 gives a talk 710 during an immersive video conference using a slide deck opened in the shared virtual channel 130. A current slide 720 includes a fragment 750 (shown in rectangular frames) that may need an additional illustration absent from the slide deck. A speech recognition (speech-to-text) component 730 identifies text 740 corresponding to the fragment 750 in speech of the presenter 110, supplemented with an indication of desirability of an additional illustration (not shown in FIG. 7; see bullet point 3 in the Summary section for the list of different visual or vocal cues that may be used by the presenter 110).

After the task of image search is confirmed, a Named Entity Recognition component 760 recognizes a named entity associated with the text 740 and the fragment 750 and submits the named entity to an image search engine 770. Several top ranked search results are displayed in a private preview panel 780 on a screen of the presenter 110. The presenter 110 may select one or more search results 785 for enriching the presentation, which causes display of an illustration 790 in the shared virtual channel 130.

Figure 8:
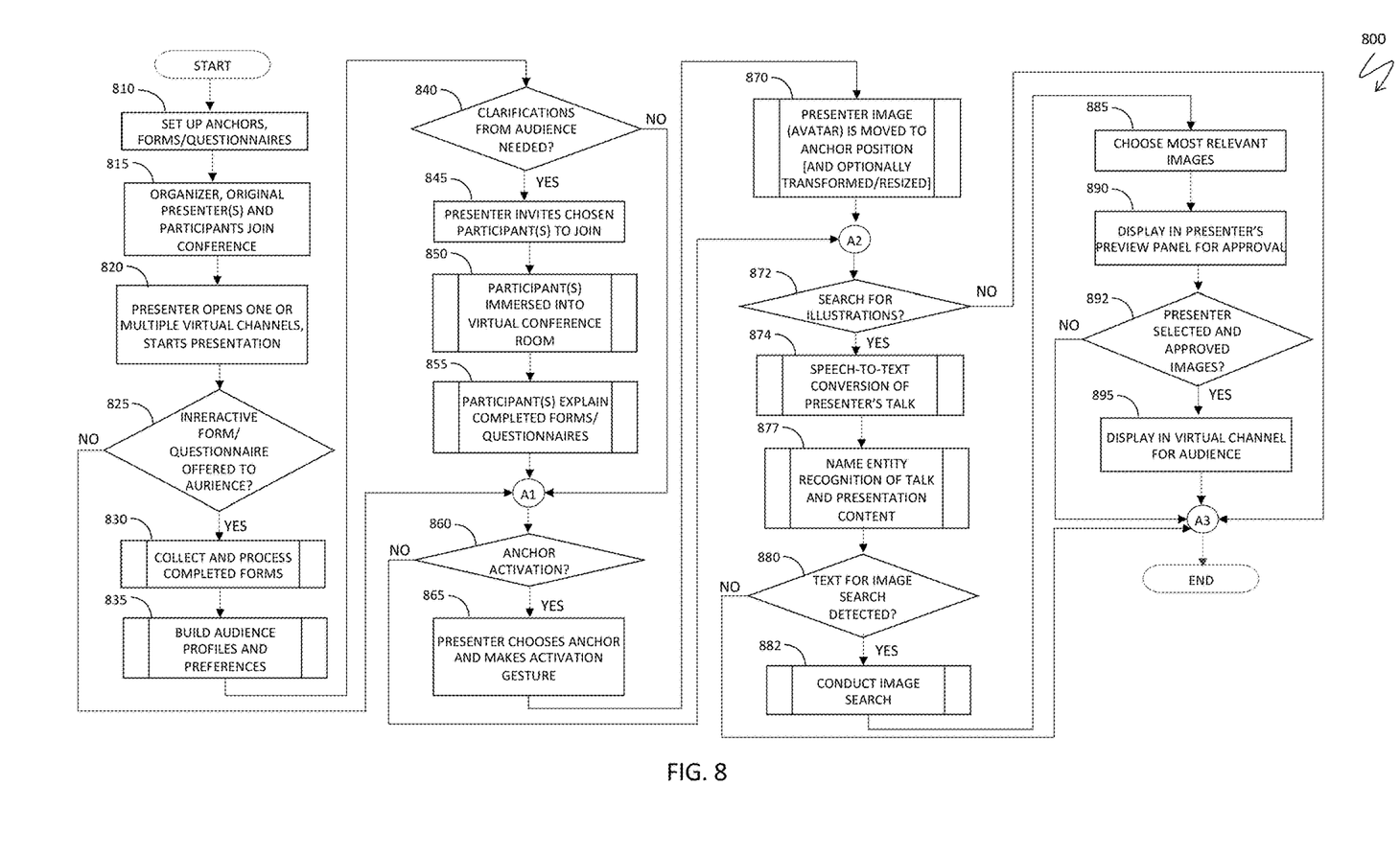
FIG. 8 is a system flow diagram illustrating system functioning in connection with setting up and activating anchors, immersive form completion, and ad hoc search and content enrichment, according to an embodiment of the system described herein.

Referring to FIG. 8, a system flow diagram 800 illustrates system functioning in connection with setting up and activating anchors, immersive form completion, and ad hoc search for content enrichment. Processing begins at a step 810, where a presenter or other person sets up anchors and prepares forms (questionnaires, quizzes, polls, etc.) for an upcoming immersive video conference. After the step 810, processing proceeds to a step 815, where a conference organizer, original presenter(s) and participants join the immersive video conference. After the step 815, processing proceeds to a step 820, where the presenter opens one or multiple virtual channels and starts the presentation. After the step 820, processing proceeds to a test step 825, where it is determined whether an interactive form is offered to the audience. If so, processing proceeds to a step 830, where the system collects and processes completed forms (regarding the forms offering and completion process, see FIGS. 3, 4 and the accompanying text). After the step 830, processing proceeds to a step 835, where the system builds audience profiles and preferences, as explained elsewhere herein (see, for example, FIG. 5 and the accompanying text). After the step 835, processing proceeds to a test step 840, where it is determined whether a clarification on the form from a participant is required, as explained elsewhere herein (see, for example, FIG. 6 and the accompanying text). If clarification is required, processing proceeds to a step 845, where the presenter invites a chosen participant (or several participants) to join as co-presenter(s) (see FIG. 6 for more information).

After the step 845, processing proceeds to a step 850, where one or multiple presenters are immersed into a virtual conference room. After the step 850, processing proceeds to a step 855, where the participant explain completed forms or questionnaires to the audience. After the step 855, processing proceeds to a test step 860, where it is determined whether the next action is an anchor activation (note that the step 860 may be independently reached from the test step 825 if it was determined that an interactive form or questionnaire was not offered to the audience and from the test step 840 if it was determined that clarifications on the forms from members of the audience were not needed). If the next action is an anchor activation, processing proceeds to a step 865, where the presenter chooses an anchor and makes an activation gesture, as explained elsewhere herein (see, for example, FIG. 2 and the accompanying text). After the step 865, processing proceeds to a step 870, where the presenter image (avatar) is repositioned to the anchor location and may be resized and otherwise altered, as explained in the Summary (bullet point 1) and in conjunction with FIG. 2.

After the step 870, processing proceeds to a test step 872, where it is determined whether search for illustrations is needed. (Note that the test step 872 may be independently reached from the test step 860 if it was determined that anchor activation) If search for illustrations is not needed, processing is complete; otherwise, processing proceeds to a step 874, where speech recognition of the talk of the presenter is performed. After the step 874, processing proceeds to a step 877, where the Name Entity Recognition of the talk text and the associated text fragments of the presentation content is applied, as explained elsewhere herein (see FIG. 7 and the accompanying text).

After the step 877, processing proceeds to a test step 880, where it is determined whether the text terms suitable for image search are detected. If not, processing is complete; otherwise, processing proceeds to a step 882, where image search is conducted. After the step 882, processing proceeds to a step 885, where most relevant retrieved images are chosen, as explained elsewhere herein (see FIG. 7 and the accompanying text). After the step 885, processing proceeds to a step 890, where a set of retrieved images is displayed in a preview panel of the presenter for potential approval. After the step 890, processing proceeds to a test step 892, where it is determined whether the presenter selected and approved one or more of retrieved images from the preview panel. If not, processing is complete; otherwise, processing proceeds to a step 895, where selected and approved images are displayed in the shared virtual channel for the video conference audience. After the step 895, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Furthermore, various aspects of the system described herein may be deployed on various devices, including, but not limited to, wearable devices, smartphones, tablets and other mobile computers. Mobile devices may use operating system(s) selected from the group consisting of: iOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of manipulating visual content of an image on a screen in an immersive video conference space, comprising:
   associating an anchor to at least one of: a background of the immersive video conference space, static interior objects in the immersive video conference space, or dynamic interior objects in the immersive video conference space or an area within a display pane of the visual content of the immersive video conference space; and
   physically actuating an anchor activation control to causes the image to move to a position of the anchor, wherein the image moves to the position of the anchor along a transitional route.

2. A method, according to claim 1 wherein the image is an image of the presenter.

3. A method, according to claim 2, wherein the presenter provides a gesture that actuates the anchor activation.

4. A method, according to claim 3, wherein the gesture is a keyboard shortcut or a touch gesture.

5. A method, according to claim 4, wherein the touch gesture is one of: a tap, a swipe, or a tap and hold.

6. A method, according to claim 1, wherein the image changes appearance as the image moves to the position of the anchor along the transitional route.

7. A method, according to claim 1 wherein the position of the anchors is preset before a start of a video conference or a recorded presentation that uses the individual conference space.

8. A method, according to claim 1 wherein the position of the anchors is created on the fly during a video conference that uses individual conference space.

9. A method of soliciting feedback from participants in a video conference, comprising:
   displaying on a screen a form via a display pane of the screen displaying a shared virtual channel that is used to provide the video conference;
   requesting that participants of the video conference fill out the form to generate a plurality of completed forms; and
   adjusting contents of the video conference based on information provided on the completed forms, wherein a presenter of the video conference invites the particular one of the participants to become a co-presenter and wherein a particular one of the participants becomes a co-presenter for the video conference that provides comments to at least one of: the form and at least one of the completed forms.

10. A method, according to claim 9, wherein the presenter requests that at least a subset of the participants fill out the form.

11. A method, according to claim 10, wherein the presenter adjusts the contents of the video conference based on the completed forms.

12. A method, according to claim 9, wherein the at least one of the completed forms contains information provided by the particular one of the participants.

13. A method of soliciting feedback from participants in a video conference, comprising:
   displaying on a screen a form via a display pane of the screen displaying a shared virtual channel that is used to provide the video conference;
   requesting that participants of the video conference fill out the form to generate a plurality of completed forms; and
   adjusting contents of the video conference based on information provided on the completed forms, wherein the form is a registration form that is presented to new participants when the new participants join the video conference and wherein a presenter of the video conference adjusts the contents of the video conference based on completed forms of the new participants.

14. A method of presenting visual content on a screen of an immersive video conference space, comprising:
   detecting a named entity mentioned by a presenter of the visual content on the screen in the immersive video conference or a recorded presentation of the visual content on the screen that uses the immersive video conference space;
   searching a slide deck associated with the immersive video conference or a recorded presentation for an image corresponding to the named entity; and searching online for an image corresponding to the named entity in response to the slide deck not containing an image corresponding to the named entity.

15. A method, according to claim 14, wherein images are rated according to relevance scores of search candidates according to at least one of: audience sentiment recognition based on audience reactions prior to searching online for the image, context analysis, and feedback of participants of the immersive video conference prior to searching online for the image.

16. A method, according to claim 15, wherein the presenter chooses one of a plurality of relevant candidate images for display to participants on the shared virtual channel.

17. A method, according to claim 16, wherein the relevant candidate images are viewable only by the presenter prior to being chosen by the presenter.

18. A method, according to claim 16, wherein the presenter chooses one of a plurality of relevant candidate images using at least one of: a touch, a 3D gesture, or an approval keyword and wherein the 3D gesture is one of: a hand gesture or a nod.

\* \* \* \* \*